UNITED STATES PATENT OFFICE.

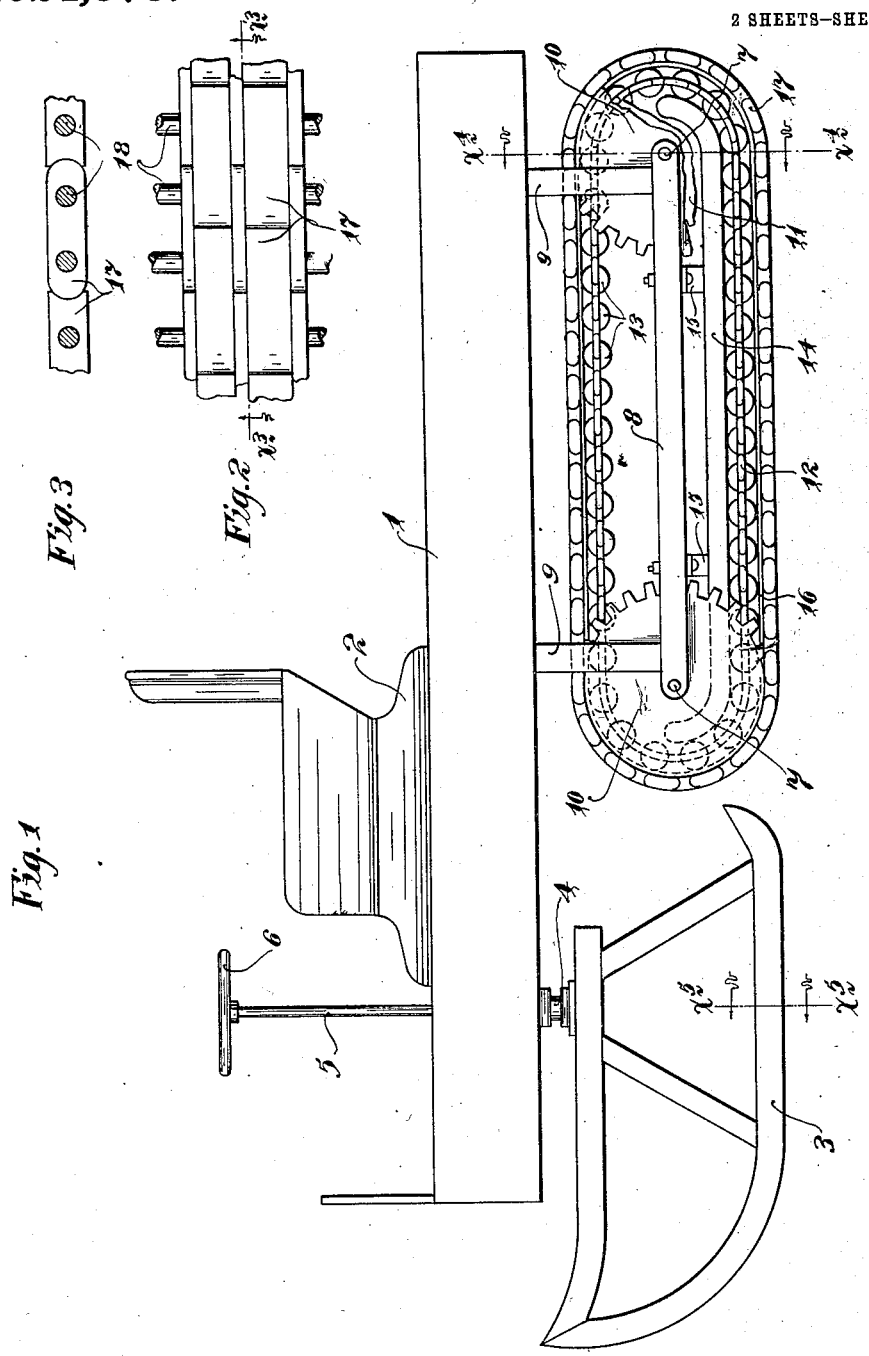

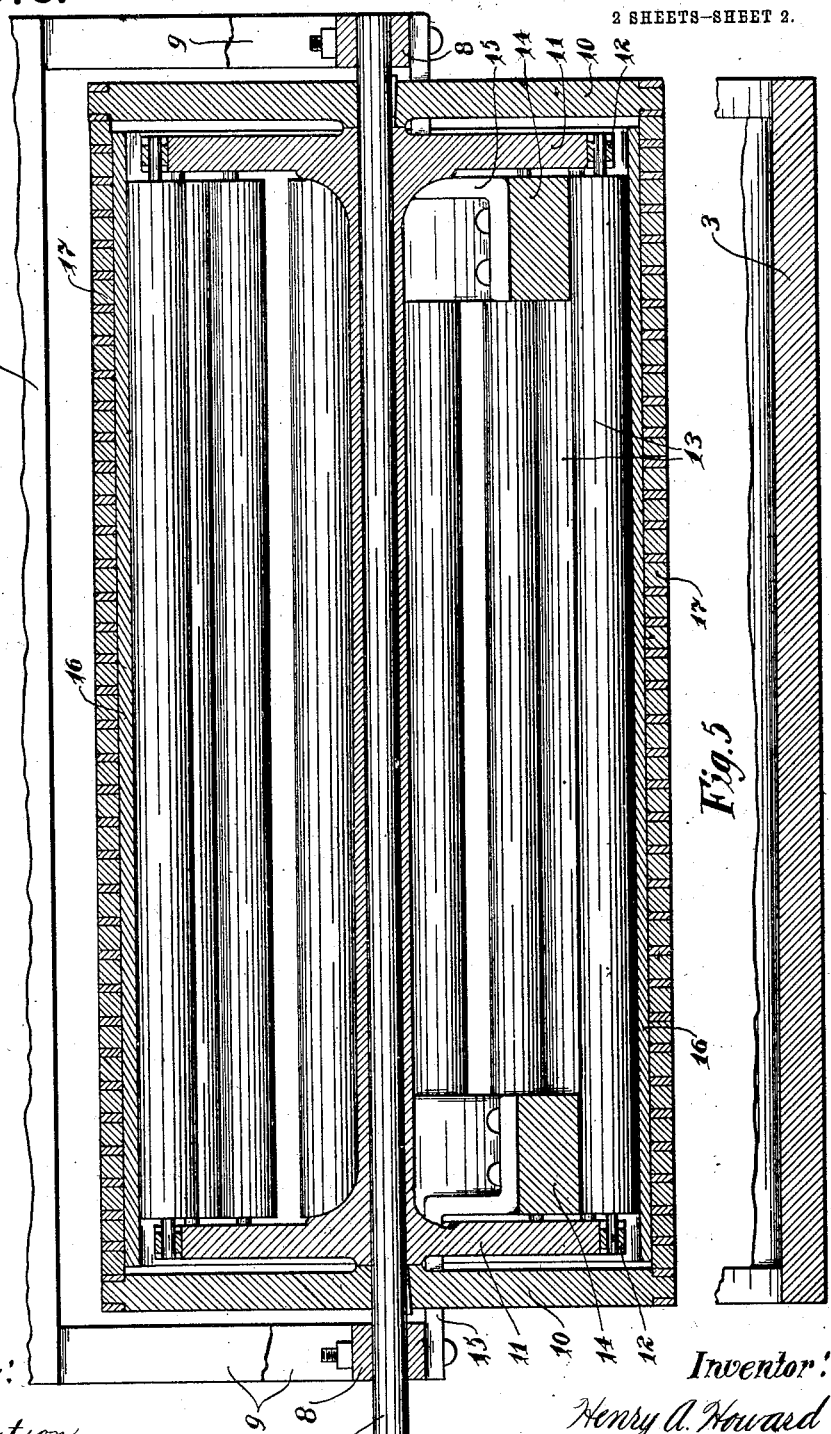

HENRY A. HOWARD, OF LLOYDMINSTER, SASKATCHEWAN, CANADA.

TRACTION-VEHICLE.

1,024,578.　　　　Specification of Letters Patent.　　Patented Apr. 30, 1912.

Application filed April 15, 1911. Serial No. 621,237.

*To all whom it may concern:*

Be it known that I, HENRY A. HOWARD, a subject of the King of Great Britain, residing at Lloydminster, in the Province of Saskatchewan, Canada, have invented certain new and useful Improvements in Traction-Vehicles; and I do hereby declare the following to be a full, clear, and exact description of the invention, such as will enable others skilled in the art to which it appertains to make and use the same.

My invention has for its object to provide improved traction vehicles especially adapted to run over snow road-beds.

Generally stated, the invention consists of the novel device and combination of devices hereinafter described and defined in the claims.

In the accompanying drawings which illustrate the invention, like characters indicate like parts throughout the several views.

Referring to the drawings,—Figure 1 is a view in side elevation showing a vehicle in the nature of a sled and incorporating my invention; Fig. 2 is a fragmentary view showing in plan a portion of the endless traction belt or apron; Fig. 3 is a section taken across the line $x^3$ $x^3$ of Fig. 2; Fig. 4 is an enlarged transverse section taken on line $x^4$ $x^4$ of Fig. 1, and Fig. 5 is an enlarged transverse section taken on line $x^5$ $x^5$ of Fig. 1.

The numeral "1" indicates the body and the numeral "2" the seat of the sled. The front end portion of the body of the sled 1 is supported by a wide faced toboggan-like runner 3 which is connected to the body 1 by a center bearing 4 and has a rigidly secured upwardly projecting steering post 5, terminating at its upper end in a hand-wheel 6 located in position to be easily engaged by the operator seated on the seat 2. This wide faced runner 3 is approximately the same width as the body 1 and, hence, like a toboggan is adapted to travel and sustain a considerable load on soft snow.

The traction mechanism of the vehicle 1, as shown, is arranged to support the rear portion of the vehicle body, and preferably constructed as follows. The numeral "7" indicates a pair of parallel transversely extended shafts journaled in frame bars 8, rigidly secured to the vehicle body 1 by vertical legs 9. For the purpose of this case, it is not thought necessary to illustrate means for propelling the vehicle. But in actual practice, the forward shaft 7 will be driven by means of an explosive engine, or other suitable motive power, mounted on the vehicle. Rigidly secured to both shafts 7, just inward of the legs 9, are large sprocket wheels 10, and loosely journaled on the said shafts, just inward of the sprockets 10 are similar sprockets 11. Laterally spaced smaller sprocket chains 12 run over the small sprockets 11. These sprocket chains 12 carry a closely spaced endless series of transversely extended anti-friction rollers 13, the end trunnions of which are journaled in certain of the links of the said chains 12. The ends of the rollers 13, when moving on their lower path, pass under and engage directly with bearing rails 14, the ends of which are curved upwardly and the main body portions of which are horizontally extended and rigidly secured to the over-lying frame bars 8, by suitable brackets 15. Extending entirely around and engaging the outer portions of the endless series of rollers 13 is an endless flexible belt or apron 16 of leather, or a combination of canvas and rubber, or of any other suitable flexible material.

Extending entirely around and engaging with the interposed apron 16 is a wide flexible tread belt or apron 17, the lower portion of which directly engages with the road-bed. This tread belt 17 is made up of a multiplicity of laterally adjacent link belts connected by long parallel transverse hinge rods 18 that extend preferably across the entire belt. The belt or apron 16 prevents the ice and snow from working up through the tread belt 17, and thereby always affords a smooth surface on top of the tread belt 17 for the rollers 13 to work upon. The outer or marginal links of this tread belt run on the large sprocket wheels 10. The intermediate links in the said belt 17 (see particular Figs. 2 and 3) are formed with joints that fit so closely that snow or ice cannot lodge in the said joints.

In practice, the shafts 7, and hence the sprockets 10 and tread belt or apron 17, will be positively driven from a motor carried by the vehicle body. This motor may be, and preferably is, a traction engine with suitable driving connections with one or both of the said shafts 7.

The wide faced toboggan-like runner 3 is, preferably at least, as wide as the tread belt or apron 17, so that when it is driven over soft snow it will form a somewhat compact road-bed for the said tread belt. The tread belt or apron 17 is made approximately as wide as the vehicle body so that only one tread belt is necessary, and a maximum supporting surface is afforded for carrying the load over soft snow. This vehicle is, therefore, adapted to run over snow-banks and over snow-covered ground where an ordinary vehicle could not possibly travel. The vehicle is, therefore, especially adapted to use in the winter time, in cold climates where the snow fall is heavy. However, various features of the invention are capable of incorporation in traction vehicles adapted for more general or varied use.

What I claim is:

1. A vehicle having a traction mechanism comprising a pair of shafts having mounted thereon pairs of relatively large and relatively small sprocket wheels located between said relatively large sprockets, a wide faced tread belt or endless apron made up of a multiplicity of parallel and transversely connected sprocket chains, the outer of which chains are arranged to run over said relatively large sprocket wheels, sprocket chains arranged to run over said relatively small sprocket wheels, and anti-friction rollers carried by said sprocket chains and extending substantially the full width of said wide faced tread belt or endless apron, said tread belt and anti-friction rollers being independent one from the other.

2. A vehicle having a traction mechanism comprising a pair of shafts having mounted thereon pairs of relatively large and relatively small sprocket wheels located between said relatively large sprockets, a wide faced tread belt or endless apron made up of a multiplicity of parallel and transversely connected sprocket chains, the outer of which chains are arranged to run over said relatively large sprocket wheels, sprocket chains arranged to run over said relatively small sprocket wheels, anti-friction rollers carried by said sprocket chains and extending substantially the full width of said wide faced tread belt or endless apron, said tread belt and anti-friction rollers being independent one from the other, guide rails on which said anti-friction rollers travel on their lower run, and a flexible belt or apron interposed directly between said tread belt and said anti-friction rollers.

3. A combination with a vehicle body, of a traction mechanism comprising transverse shafts, fixed and loose sprockets on said transverse shafts, endless chains arranged to run over said loose sprockets, and provided with an endless series of anti-friction rollers, fixed rails on which the said rollers travel on their lower run, and a wide faced jointed traction belt arranged to run over said fixed sprockets and around the said endless series of anti-friction rollers, and a flexible belt or apron interposed directly between the said tread belt and the anti-friction rollers.

In testimony whereof I affix my signature in presence of two witnesses.

HENRY A. HOWARD.

Witnesses:
 HARRY D. KILGORE,
 BERNICE G. WHEELER.